United States Patent [19]

Jubin et al.

[11] Patent Number: 5,024,647
[45] Date of Patent: Jun. 18, 1991

[54] CENTRIFUGAL CONTACTOR WITH LIQUID MIXING AND FLOW CONTROL VANES AND METHOD OF MIXING LIQUIDS OF DIFFERENT PHASES

[75] Inventors: Robert T. Jubin, Powell; John D. Randolph, Maryville, both of Tenn.

[73] Assignee: The United States of America as represented by the United States Department of Energy, Washington, D.C.

[21] Appl. No.: 365,400

[22] Filed: Jun. 13, 1989

[51] Int. Cl.$^5$ .......................... B01D 21/26; B04B 1/00
[52] U.S. Cl. ...................................... 494/37; 366/338; 494/43; 494/60; 494/65; 494/85
[58] Field of Search ....................... 494/22, 23, 27, 28, 494/29, 43, 50, 53, 54, 56, 58, 60, 62, 63, 65, 66, 79, 901, 16-21, 31-34, 37, 44, 47, 48, 84, 85; 366/136, 137, 262-266, 306, 307, 338, 339, 134, 171, 174, 175; 210/360.1, 383, 787, 378, 656; 436/45, 177

[56] References Cited

U.S. PATENT DOCUMENTS

| | | | |
|---|---|---|---|
| 2,577,095 | 12/1951 | Walker | 366/307 X |
| 2,779,537 | 1/1957 | Madany | 494/22 |
| 3,756,505 | 9/1973 | Miachon | 494/65 X |
| 4,406,651 | 9/1983 | Dudrey et al. | 494/56 X |
| 4,869,594 | 9/1989 | Mahoney, Jr. | 366/338 X |

OTHER PUBLICATIONS

Jennings, Alfred S., "A Miniature Centrifugal Contractor", Engineering and Equipment (TID-4500, 17th Ed., 1962), DP-680.
Kishbaugh, Albert A., "Performance of a Multi-Stage Centrifugal Contactor", Engineering and Equipment (TID-4500, 23rd Ed., 1963), DP-841.
Burch, et al., "Consolidated Fuel Reprocessing Program Progress Report for Period Oct. 1 to Dec. 31, 1984", (ORNL/TM-9513 Dist. Category UC-86, 1985).
W. D. Burch, et al., "Consolidated Fuel Reprocessing Program Progress Report for Period Oct. 1 to Dec. 31, 1986", (ORNL/TM-10359, Dist. Category UC-86, 1987).
Singh, S. P., "Operating Experience with Advanced Centrifugal Contactors in the Integrated Equipment Test Facility", (ORNL/TM-10565, Dist. Category UC-86T (1987)).
R. T. Jubin, "Preliminary Evaluation of Overflow Ports in a Four-Stage Experimental Centrifugal Solvent Extraction Contactor", ORNL/TM-9878, 1986.
R. T. Jubin, "Developments in Centrifugal Contactor Technology", ORNL/TM-10768, Dist. Category UC-526T (1988).

Primary Examiner—Philip R. Coe
Assistant Examiner—Charles Cooley
Attorney, Agent, or Firm—Stephen D. Hamel; William R. Moser; Richard E. Constant

[57] ABSTRACT

The invention is directed to a centrifugal contactor for solvent extraction systems. The centrifugal contactor is provided with an annular vertically oriented mixing chamber between the rotor housing and the rotor for mixing process liquids such as the aqueous and organic phases of the solvent extraction process used for nuclear fuel reprocessing. A set of stationary helically disposed vanes carried by the housing is in the lower region of the mixing chamber at a location below the process-liquid inlets for the purpose of urging the liquids in an upward direction toward the inlets and enhancing the mixing of the liquids and mass transfer between the liquids. The upper region of the mixing vessel above the inlets for the process liquids is also provided with a set helically disposed vanes carried by the housing for urging the process liquids in a downward direction when the liquid flow rates through the inlets are relatively high and the liquids contact the vane set in the upper region. The use of these opposing vane sets in the mixing zone maintains the liquid in the mixing zone at suitable levels.

11 Claims, 2 Drawing Sheets

CENTRIFUGAL CONTACTOR WITH LIQUID MIXING AND FLOW CONTROL VANES AND METHOD OF MIXING LIQUIDS OF DIFFERENT PHASES

This invention was made as a result of work under contract DE-AC05-84OR21400 between Martin Marietta Energy Systems, Inc., and the U.S. Department of Energy.

BACKGROUND OF THE INVENTION

The present invention relates generally to centrifugal contactors for separating liquids of different weight phases, and more particularly to such centrifugal contactors provided with vane sets in a mixing zone for the process liquids for enhancing the mixing of the liquids and for urging the liquid in the mixing zone toward the process liquid inlets.

Centrifugal contactors have been found to provide a highly satisfactory mechanism for separating liquids from one another based on different weight phases. The use of centrifugal contactors is particularly advantageous in operations where short residence times, small inventories and high separating force fields are beneficial. Typical employment of centrifugal contactors where success has been demonstrated is in areas including pharmaceuticals, processing of lubricating oils, treatment of liquid wastes and nuclear reactor fuel reprocessing. Centrifugal contactors are particularly desirable for the reprocessing of nuclear reactor fuels since in such instances short residences times, small inventories and high separating force fields are of high priority due to the high radiation fields in the process liquids as generated by fission products therein which damage the extraction solvents over extended periods of contact. Also, with small inventories criticality concerns with respect to the fissionable material in the process liquids are minimized and emulsification problems are significantly controlled by the large separating force applied to the process liquids in the centrifugal contactor.

In nuclear reactor fuel reprocessing operations, the centrifugal contactors can be utilized to separate uranium and plutonium values from fission products and other actinides undesirable for use nuclear reactor fuels. Typically, in a nuclear fuel reprocessing operation using centrifugal contactors, a cascade of several centrifugal contactors are employed with each centrifugal contactor comprising a housing containing a vertically oriented rotor. The process liquids comprise a heavy solvent or organic phase and a lighter aqueous phase which are introduced into the centrifugal contactors through separate conduits or inlets which are in registry with a mixing zone before the liquid mixture enters the rotor where centrifugal force is utilized to separate the heavy phase from the lighter phase by forcing the heavy phase to flow outwardly away from the rotational axis of the rotor and displace the lighter phase closer to the rotational axis of the rotor. These process streams are then individually collected at the upper end of the rotor at a location adjacent to the outer periphery thereof for the heavier liquid phase and at a location adjacent to the rotational axis of the rotor for the lighter liquid phase. During this introduction of the process liquids into the mixing zone, the two phases are introduced tangentially into a mixing zone to enhance mixing and mass transfer between the liquid phases so that a good mixture of the liquid phases enter the rotor through an opening in the base thereof due to pressure gradients developed by the rotation of the rotor. In nuclear reactor fuel reprocessing systems, the centrifugal contactors, which may employ the improvement provided by the present invention, are disposed in a multistage or cascade arrangement with each contactor having a diameter of 5.5 centimeters. A detailed description of the use of centrifugal contactors in a multistage nuclear reactor fuel reprocessing operation is set forth in a report entitled *Developments in Centrifugal Contactor Technology*, R. T. Jubin et al, ORNL/TM-10768, U.S. Government Printing Office, September 1988. This report is incorporated herein by reference.

While the present invention is particularly useful in centrifugal contactors such as those envisioned for the use of reprocessing nuclear fuels, it is to be understood that the present invention may be utilized in centrifugal contactors employed for the separation of other liquids such as those generally mentioned above.

It has been found that while the use of centrifugal contactors in a multistage system are desirable for continuous countercurrent liquid extraction processes, a problem can occur during the flow of the process liquids between the various centrifugal contactors in that at relatively high flow rates such as when the one of the centrifugal contactors in the system ceases to operate. When this condition is present the liquids tend to flood the process liquid mixing zone of one or more of the centrifugal contactors coupled thereto and the process liquids seep into the discharge collection plenums of the contactor and contaminate the discharge, single-phase, streams of liquids with a two phase solution so as to significantly detract from the operation of the centrifugal contactors in the cascade. Another problem may also occur when relatively low flow rates of process liquids are entering the mixing zone. In such instances the level of the process liquids in the mixing zone falls below a level at which proper mixing and sufficient mass transfer can be achieved in the liquids before they are discharged from the mixing zone into the separating zone within the rotor. Still another problem with low liquid levels in the mixing zone is that vortices form in the process liquids in the mixing zones and introduce cavitation in the process liquids which significantly reduces the efficiency of the mass transfer between the liquid phases and also introduces air into the liquid process stream which has a deleterious effect upon the liquid distribution and countercurrent flow of the process liquids. In view of these problems, it was found that in order to satisfactorily operate a multistage centrifugal contactor system, a relatively restricted and narrow range of flow rates for the process liquids was required so as to minimize some of the problems associated with excessive or relatively low flow rates of process liquids. Even with this restriction on the flow rates of process liquids the problems occurring when one or more centrifugal contactors in the cascade fail can not be readily compensated for or overcome.

SUMMARY OF THE INVENTION

Accordingly, it is the primary aim or objective of the present invention to provide the process liquid mixing zone of centrifugal contactors with flow control and liquid mixing mechanisms which significantly minimize or obviate the problems associated with the relatively high and low flow rates of the process liquids. With the present invention incorporated in centrifugal contactor whether the contactor is used alone or in a cascade, a significantly greater range in both the high and low flow rates of process liquids into the mixing zone in the contactor can be utilized than heretofore found to be practical. Further, a significant enhancement in the mixing of the liquids, the surface area generation and the mass transfer are achieved between the process liquids.

Generally, the objective of the present invention is provided in a centrifugal contactor which comprises housing means having inner wall portions defining an elongated, vertically extending cylindrical cavity therein. A hollow elongated cylindrical rotor means having openings at upper and lower ends thereof is disposed in the cavity of the housing means with outer vertical wall portions of the rotor means being radially inwardly spaced from the inner wall portions of the housing means for defining therewith a vertically oriented annular liquid mixing zone or volume. Inlet passageway means penetrate the housing means and are in registry with the annular volume at location intermediate the upper and lower ends of the mixing volume and the rotor means for introducing liquid into the annular volume for subsequent reception in the hollow rotor means through the opening at the lower end thereof. Stationary vane means are carried by the housing means on the inner wall portions thereof and project radially inwardly into the annular volume with the vane means being so oriented in the annular volume that the vane means urge the liquid toward the inlet passage way means when the rotor means is rotated and liquid is present in annular volume.

In accordance with the present invention, vane means are disposed on the housing walls partially defining the mixing volume at a location intermediate the inlet passageway means and the lower end of the rotor means with these vane means comprising a plurality of helical vanes disposed on the housing means in a common horizontal plane at circumferentially spaced apart locations underlying, preferably directly under, the inlet passageway means. The present invention also provides vane means disposed on the same housing walls at a location intermediate the inlet passageway means and the upper end of the rotor means. These upper vane means comprise a plurality of helical vanes disposed in a common horizontal plane and circumferentially spaced apart from one another about the mixing volume in the housing means. As the rotor means is rotated with process liquid in the mixing volume the lower vane continually urge the liquid to rise within the mixing chamber or volume so as to provide for the aforementioned increases in mixing and mass transfer along with the elimination or significant reduction in the generation of vortices in the lower region of the mixing volume. The vanes in the upper region of the mixing volume come into play when relatively high flow rates of process liquids are introduced into the mixing volume so as to urge the liquid downwardly in the mixing volume. The upper vanes are purposely designed to provide a greater downward force than that provided by the lifting force of the lower vanes so as to maintain the liquids in a region between the vanes when excessive flow rates are encountered. This arrangement significantly minimizes or negates the undesirable flow of process liquids into the discharge plenum of the centrifugal contactor.

Other and further objects of the invention will be obvious upon an understanding of the exemplary embodiments about to be described or will be indicated in the appended claims and various advantages not referred to herein will occur to one skilled in the art upon employment of the invention in practice.

The particular details of the rotor and housing as well as the drive mechanism for the rotor are not at the point of invention and the constructional details of these features may be varied in accordance with different embodiments desired for centrifugal contactors which may satisfactorily incorporate the present invention.

A preferred embodiment of the invention has been chosen for the purpose of illustration and description. The embodiment illustrated is not intended to be exhaustive or to limit the invention to the precise form disclosed. It is chosen and described in order to best explain the principles of the invention and their application of practical use and thereby enables others skilled in the art to best utilize the invention in various embodiments and modifications as are best adapted to the particular use contemplated.

DETAILED DEScRIPTION OF THE INVENTION

Figure 1:
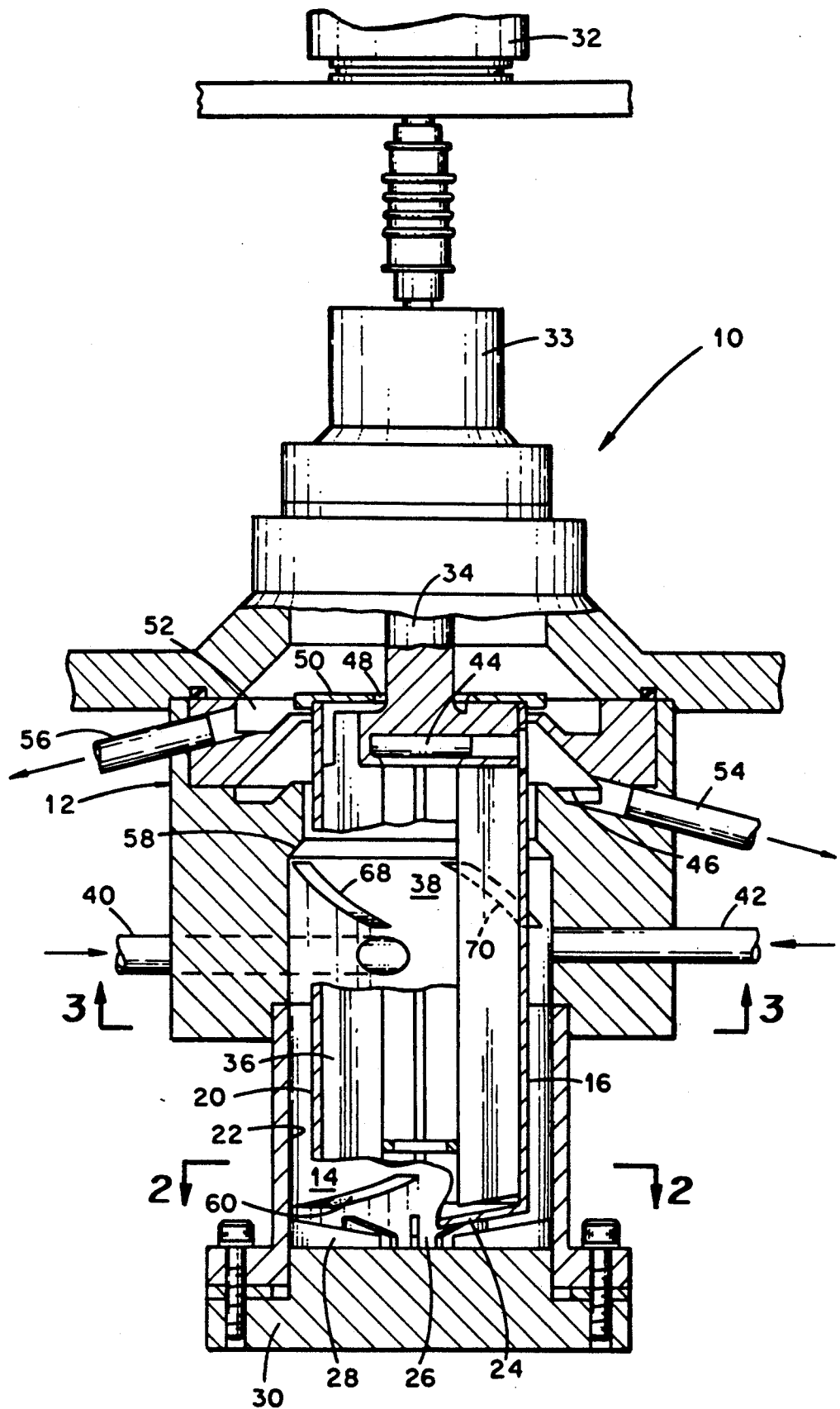
FIG. 1 is a vertical sectional view of a centrifugal contactor incorporating the vane arrangement of the present invention with sections of the rotor broken away for illustrating the vane location within the process liquid mixing zone as utilized for providing the improved flow control and mixing of the process liquids as envisioned by the present invention.
Figure 3:
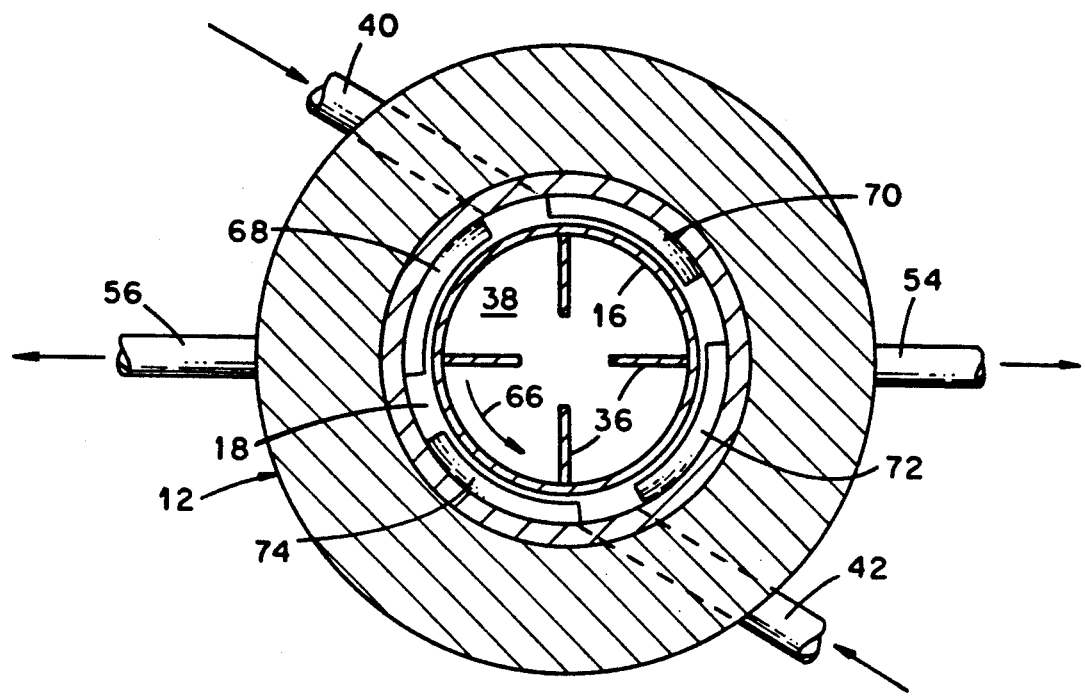
FIG. 3 is a view taken along lines 3—3 of FIG. 1 showing details of the vane arrangement in the upper region of the mixing zone.
Figure 2:
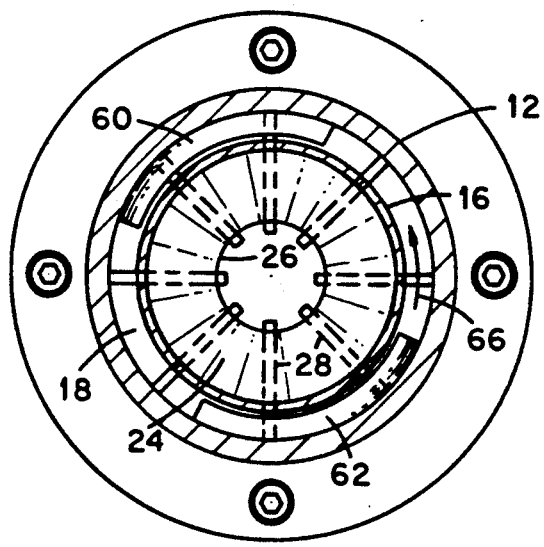
FIG. 2 is a plan view taken along lines 2—2 of FIG. 1 showing details of the vane arrangement in the lower region of the mixing chamber.

In FIGS. 1-3 the single centrifugal contactor illustrated is to be considered as a single contactor or representative of any one of the plurality of the contactors used in a multistage arrangement wherein the separation of liquid phases of different densities is achieved such as needed for the reprocessing of nuclear reactor fuels as described above. The centrifugal contactor generally indicated at 10 for the purposes of this description may be of a size having a diameter of 5.5 centimeters and coupled to a plurality of similar contactors forming the cascade. The number of contactors in the cascade is dictated by the particular use contemplated. The centrifugal contactor 10 comprises a housing 12 which is vertically oriented and contains a cylindrical, vertically oriented cavity 14 which is utilized to house an elongated, vertically standing cylindrical rotor 16. The housing 14 is shown in a multiple piece construction which facilitates disassembly for cleanup and part replacement purposes. The outer diameter of the rotor 16 is less than the inner diameter of the housing cavity 14 so as to define an elongated annular chamber or annulus which provides a mixing zone or volume 18 for the process liquids. This annular volume 18 is defined by the outer walls 20 of the rotor 16 and the inner walls 22 of the housing which also define the housing cavity 14. The rotor 16 is shown with a tapered base 24 with a central inlet or opening 26 into the rotor. Stationary vanes 28 are attached to the a tapered base 30 of the housing with these vanes 28 radially inwardly extending from a location near the housing walls to essentially the center of the housing cavity 14 for inhibiting the formation of vortices within the liquid entering the rotor 16 through the rotor inlet 26. Typically, the rotor 16 of the centrifugal contactor 10 is rotated by a suitable drive mechanism 32 and a bearing assembly 33 through a shaft 34 coupled to the top of the rotor 16. Vertically oriented blades 36 (four) are disposed in the rotor cavity 38 for facilitating the centrifugal separation of the process liquids entering the rotor cavity 38 through the opening 26. As the rotor 16 is rotated, the heavier phase of the liquid mixture is driven outwardly toward the side walls of the rotor while the lighter phase is displaced toward the rotational axis of the rotor 16, i.e., near the center of the rotor cavity 38 by the heavier phase.

The process liquids such as the aqueous phase and the organic phase in a nuclear reactor fuel reprocessing operation are introduced into the housing 12 through tangentially oriented inlets which are in registry with the annular mixing volume 18 at a location intermediate the upper and lower ends thereof. In FIG. 1 the inlets are illustrated in an arrangement for a multistage nuclear fuel reprocessing operation with the inlet 40 shown as the inlet for the aqueous phase while inlet 42 is shown as the inlet for the organic phase. Each stage of the multistaged centrifugal contactors is provided with similar tangentially oriented inlets for introducing the process liquid into the mixing volume 18. The resulting spiral flow of the liquids into the mixing volume 18 enhances the mixing and mass transfer of the liquids within the mixing volume. This spiral flow of the liquids into the annular volume coupled with the vane means of the present invention, as will be described in detail below, significantly increases the extent of mixing and the mass transfer in the liquids before they enter the rotor for subsequent separation of the liquid phases.

The thoroughly mixed liquids enter the rotor 16 through the opening 26 and are centrifugally separated according to phase weight by the rotation of the rotor 16. The lighter phase in the liquid mixture which would be the organic phase in a Purex nuclear reactor fuel reprocessing operation is shown being removed from the rotor cavity 38 through a radially extending passageway 44 which is in registry with the central area of the rotor cavity 38 at the top end thereof and a plenum or collection ring 46. The heavier phase in the liquid mixture which would be the aqueous phase in a nuclear reactor fuel reprocessing operation is removed from the rotor cavity 38 via passageway 48 through the top end cap 50 of the rotor 16. This passageway 48 is in registry with the rotor cavity 38 and a plenum or collector ring 52. Outlet conduits 54 and 56 are respectively utilized for conducting the separated lighter and heavier phases to adjacent centrifugal contactors in a multistage operation.

In accordance with the present invention, vane means are positioned within the annular mixing volume 18 at a location underlying the inlets 40 and 42 for the process liquids and also at a location above these inlets. As briefly mentioned above with normal flow rates of process liquids into the annular mixing volume 18, the liquid level in this mixing volume is maintained between the upper and lower vane means with the lower vane means urging the liquid to a level in the mixing volume that is higher than would be achievable without the presence of the lower vane means. Thus, with relatively low flow rates the liquid level within the mixing chamber will be prevented by the lower vane means from reaching an excessively low level which would inhibit desired mixing of the process liquids and initiate cavitation and air entrainment. In the event of relatively high flow rates of process liquids into the mixing volume 18 through the inlets 40 and 42, the vane means in the upper region of the mixing volume 18 rotor would overcome the lifting action of the lower vane means and thereby force the liquid downwardly in the mixing chamber. The upper and lower vane means also help create a turbulence pattern within the liquids in the mixing volume which is of benefit to surface area generation and mass transfer during high liquid flow rates.

The housing 12 is provided with a radially inwardly extending shoulder 58 at the upper end of the mixing volume 18 at a location near the upper end of the rotor 16. The shoulder 58 was utilized in previous centrifugal contactors to restrict help inhibit flow of the process liquids from the mixing volume 18 into the plenum or collector rings 46 and 52. On the other hand, the vane means of the present invention in the upper region of the mixing volume have been found to essentially inhibit the flow of process liquids from the mixing volume into this plenum region so as to overcome or significantly minimize a major problem associated with excess flow of process liquids entering a stage of the multistage centrifugal contactor arrangement and contaminating or diluting the separated liquid streams at the collector rings.

As shown in FIGS. 1 and 2, the vanes 60 and 62 are disposed on the inside walls 22 of the housing 12 with the center of each vane 60 and 62 preferably located directly below the center point of the inlets 40 and 42, respectively. Each vane 60 or 62 is of a rectangular configuration with a thickness so that the gap between the rotor 16 and vane 60 or 62 is in a range of about 0.02 to 0.04 inch and circumferentially extends on the housing wall 22 over an arc length in the range of about 70 to 90 degrees. The vanes 60 and 62 are helically disposed at an angle of inclination in the range of 5 to 30 degrees with respect to a horizontal cross-sectional plane taken through the rotational axis of the rotor 16. A vane inclination angle of 15 degrees is preferred with the two vane arrangement described herein. The vanes 60 and 62 are disposed in the housing 12 with the uppermost end of the vanes being the trailing end of the vanes with respect to the direction of rotation of the rotor 16 as generally shown by the arrow 66 in FIG. 2.

In the 5.5 centimeter centrifugal contactor the mixing volume 18 is provided with a cross section or width of about 0.288 inch between the walls 22 of the housing 12 and the walls 20 of the rotor 16. The vanes 60 and 62 radially inwardly extend from the housing walls 22 a distance of about 0.250 inch to provide a clearance of about 0.038 inch between the radially innermost edge or tip of the vane and the walls 20 of the rotor 16. This relatively narrow gap between the vanes and the rotor is desirable to assure that the vanes will provide the desired mixing and lifting of the process liquids within the lower region of the mixing volume 18.

The shape of the vanes 60 and 62 may be relatively straight or be provided with a radius in the range of about 2 to 5 inside diameters of the housing with the concave surface of the vanes facing the inlets 40 and 42 for the process liquids so as to assure that the liquids are urged toward the inlets 40 and 42 during operation of the centrifugal contactor. The vanes 60 and 62 are disposed in the mixing volume 18 at a location adjacent to the lowermost end of the rotor 16 so as to assure contact with minimum quantities of process liquids in the annular mixing volume 18 so as to provide the desired function of lifting the process liquid in the mixing volume 18 which enhances the mixing of the liquids while inhibiting the creation of vortices and the entrainment of air.

While two vanes 60 and 62 are shown, a greater number of vanes may be placed within this lower region of the mixing volume 18. However, the use of a greater number of vanes will require that the angle of inclination for the vanes be such that the uplifting force on the process liquids imposed by the vanes is always less than the downward force provided by the vanes in the upper region of the mixing volume 18. This relationship between the vanes assures that the process liquids flow downwardly during the rotation of the rotor especially when relatively high levels of liquids are present the mixing volume 18. When process liquids entering the inlets 40 and 42 are at normal flow rates, the annular volume 18 is provided with a liquid level which is below the vanes in the upper region of the mixing volume 18. With such liquid levels only the lower vanes 60 and 62 provide any action on the liquids.

As best shown in FIGS. 1 and 3 the upper region of the mixing volume 18 is provided with a vane set of four vanes 68, 70, 72, and 74. These vanes are helically inclined in the opposite direction to the vanes 60 and 62 in the lower region of volume 18 so that during rotation of the rotor 18 the liquid contacting the upper vanes will be forced downwardly toward the inlets 40 and 40 and the lower region of the annular mixing volume 18. These upper vanes are provided with arc lengths in the range of about 70 to 90 degrees with the vanes being uniformly and circumferentially spaced apart from one another about the inner wall 22 of the housing 12 in the upper region of the mixing volume 18. Each vane 68, 70, 72, and 74 may be of the same or essentially the same radial width as the vanes 60 and 62 so that the gap between the vane tips and the walls of the rotor is minimal. Also, each of these vanes is inclined at an angle in the range of about 45 to 55 degrees with respect to a horizontal cross section taken through the rotational axis of the rotor 16. These vanes 68, 70, 72, and 74, like the vanes 60 and 62 in the lower region of volume 18, may be of a rectangular configuration with a thickness such that the gap between the rotor 16 and any of these vanes is in a range of about 0.02 to 0.04 inch and be straight or be provided with a radius in a range of about 2 to 5 housing diameters inch with the concave surface of the vanes facing the inlets 40 ad 42 so that upon rotation of the rotor process liquids contacting the upper vanes is urged downwardly toward the lower region of the mixing volume 18.

The inclination angle and number of vanes in the upper region is greater than that in the lower region of the mixing volume 18 in order to overcome the liquid lifting action provided on the process liquid by the lower vane set to assure that when liquid contacts the upper vane set that the liquid is pushed downwardly with a greater force than provided by the lifting force of the lower vane set. This vane arrangement assures that the liquid is maintained in the lower region of the mixing volume with minimal vortex generation while providing the desired mixing of the process liquids.

It will be seen that the present invention provides an arrangement in centrifugal contactor systems wherein problems heretofore encountered when the flow rate of the process liquids is outside of a relatively narrow range are substantially minimized or obviated. The vane sets within the mixing volume not only provide for a greater range in the flow of the process liquids but also create a significant amount of turbulence in the process liquids which is beneficial to surface area generation and mass transfer between the process liquids at all operational flow rates.

We claim:

1. A centrifugal contactor comprising housing means having inner wall portions defining an elongated vertically extending cylindrical cavity therein, elongated cylindrical rotor means having openings therein at an upper end and at a lower end thereof disposed in said cavity and having outer vertical wall portions thereon radially inwardly spaced from said inner wall portions of the housing means for defining therewith a vertically oriented annular liquid mixing volume between said inner wall portions and said outer vertical wall portions, two circumferentially spaced apart and tangentially oriented inlet passageway means penetrating said housing means and in registry with said annular mixing volume at a location intermediate the upper and lower ends of said rotor means for introducing liquids into said annular mixing volume for subsequent reception in said rotor means through the opening in the lower end thereof, and stationary vane means carried by said housing means on said inner wall portions at locations vertically spaced from said inlet means and projecting radially inwardly into said annular mixing volume to a location adjacent to said outer vertical wall portions of said rotor means with said vane means being oriented in said annular mixing volume for urging liquid toward said inlet passageway means when said rotor means is rotated and the liquids are in said annular volume.

2. A centrifugal contactor as claimed in claim 1, wherein said vane means comprise a plurality of elongated vanes helically disposed on said housing means.

3. A centrifugal contactor as claimed in claim 2, wherein said vanes are disposed on said housing means at a location intermediate said inlet passageway means and the lower end of said rotor means.

4. A centrifugal contactor as claimed in claim 3, wherein said plurality of vanes comprises two vanes disposed on the inner wall portions of said housing means in a common horizontal plane at uniformly circumferentially spaced apart locations underlying each of said inlet passageway means, and wherein the location intermediate said inlet passageway means and the lower end of said rotor means is closer to the lower end of said rotor means than to said inlet passageway means.

5. A centrifugal contactor as claimed in claim 4, wherein each vane of said plurality of vanes circumferentially extends on said housing means a distance in a range of about 70 to 90 degrees and is inclined at an angle in a range of about 5 to 30 degrees with respect to a horizontal cross-sectional plane of the housing means with the uppermost end of each vane being the trailing end of the vane with respect to the direction of rotation of the rotor means.

6. A centrifugal contactor as claimed in claim 2, wherein said plurality of vanes are disposed on said housing means at a location intermediate said inlet passageway means and the upper end of said rotor means.

7. A centrifugal contactor as claimed in claim 6, wherein said plurality of vanes comprises four discreet vanes disposed on said housing means in a common horizontal plane at uniformly circumferentially spaced apart locations on the inner wall portions of said housing means.

8. A centrifugal contactor as claimed in claim 7, wherein each vane of said plurality of vanes circumferentially extends on said housing means a distance in a range of about 70 to 90 degrees and is inclined at an angle in a range of about 45 to 55 degrees to a horizontal cross-sectional plane of said housing means with respect to the rotational axis of the rotor means, and wherein the uppermost end of each vane is the leading end of the vane with respect to the direction of rotation of the rotor means.

9. A centrifugal contactor as claimed in claim 2, wherein said plurality of vanes are disposed on said housing means at vertically spaced apart locations intermediate said inlet passageway means and the lower end of said rotor means and at a location intermediate said inlet passageway means and the upper end of said rotor means.

10. A centrifugal contactor as claimed in claim 9, wherein the plurality of vanes disposed in a lower region of the mixing volume at a location intermediate said inlet passageway means and the lower end of said rotor means comprises two vanes disposed on said housing means at circumferentially spaced apart locations underlying said inlet passageway means with each of said two vanes having an arc length in a range of about 70 to 90 degrees and inclined at an angle in a range of about 5 to 30 degrees with respect to a horizontal cross-sectional plane of said rotor means, and wherein each of the plurality of vanes disposed in an upper region of the mixing volume at a location intermediate the inlet passageway means and the upper end of said rotor means comprises four vanes with each vane circumferentially extending on the housing an arc length in a range of about 70 to 90 degrees and inclined at an angle in a range of about 45 to 55 degrees with respect to a horizontal cross-sectional plane of said housing means, and wherein said plurality of vanes in the lower region and said plurality of vanes in the upper region are inclined in opposite directions for urging the liquid contacted thereby in said annular mixing volume toward said inlet passageway means during rotation of said rotor means.

11. A method for mixing process liquids in a centrifugal contactor having an open vertically oriented housing with a vertically oriented rotor disposed therein at a location radially inwardly spaced from the housing so as to define therebetween an annular liquid mixing volume for process liquid of different phases introduced into the mixing volume through inlets in registry with the mixing volume at a location intermediate upper and lower regions thereof, said method comprising the steps of contacting process liquid in the lower region of the mixing volume with vane means disposed on said housing at a location underlying said inlets for urging the process liquid in an upward direction toward said inlets when process liquid is in said mixing volume for enhancing the mixing of the process liquid within the mixing volume and maintaining the level of the process liquid within the mixing volume at a sufficient height to inhibit the creation of vortices and air entrapment in the process liquid due to an insufficient volume of process liquid in the annular mixing volume, and contacting process liquid in an upper region of said mixing volume with further vane means disposed on said housing at a location overlying the inlets for urging the process liquid contacted thereby in a downward direction towards said inlets.

* * * * *